March 3, 1942.  B. G. CARLSON ET AL  2,274,917
SELECTOR VALVE
Filed Aug. 14, 1941

INVENTORS
BERT G. CARLSON
CHARLES H. CRAWLEY
BY Bosworth & Sessions
ATTORNEYS

Patented Mar. 3, 1942

2,274,917

UNITED STATES PATENT OFFICE 2,274,917

SELECTOR VALVE

Bert G. Carlson, Willobee, and Charles H. Crawley, Euclid, Ohio, assignors to The Weatherhead Company, Cleveland, Ohio, a corporation of Ohio Application August 14, 1941, Serial No. 406,826

6 Claims. (Cl. 277—21)

This invention relates to valves, and more specifically to improvements in a selector valve particularly adapted for use with air plane instruments.

The embodiments of the invention disclosed herein are directed to a three-way valve particularly adapted for use in conjunction with airplane instruments, for example, where two instruments are adapted alternately to be connected to a single source of vacuum. The valve is also adapted for use in conjunction with a single instrument such as an air speed indicator which has connected thereto two air speed tubes positioned on different parts of an airplane. Thus, if one instrument should fail to function, the valve may be actuated to permit the use of the other instrument or the valve may be employed for checking one instrument against another one. The valve of the present invention is designed so that it may be operated instantly and easily without diverting the pilot's attention from the operation of the airplane. To this end, the valve is provided with a snap-action closure member to facilitate the opening or closing of the valve ports.

One of the objects, therefore, of the present invention resides in the provision of a three-way valve particularly adapted for use with one or more airplane instruments. Another object of the invention is to provide a simple and compact valve embodying a snap-action closure member so that the valve may be actuated quickly with a minimum of effort on the part of the pilot. Further objects are to provide such a valve which is light in weight, economical of manufacture and reliable and efficient in service.

Other objects and advantages more or less ancillary to the foregoing and the manner in which all the various objects are realized will appear in the following description, which considered in connection with the accompanying drawing, sets forth preferred embodiments of the invention.

I preferably accomplish the above and other objects of the present invention by providing a valve casing having mounted therein a spring actuated rocker which has resilient sealing elements loosely mounted on the ends thereof, said sealing elements engaging seats provided in certain of the ports formed in the valve casing for sealing one or more of the ports upon the actuation of the rocker plate. Preferably the rocker is actuated by a member pivoted in a wall of the casing and having a rounded point formed on the rocker engaging end thereof.

Figure 1:
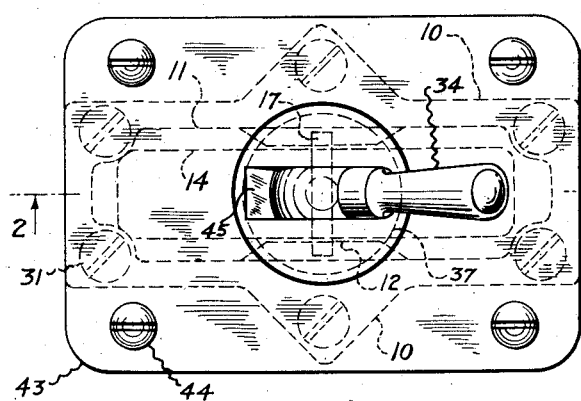
Figure 5:
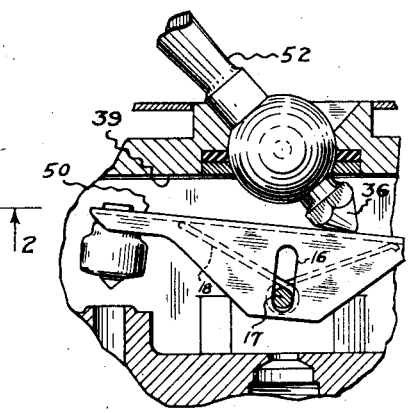
Figure 2:
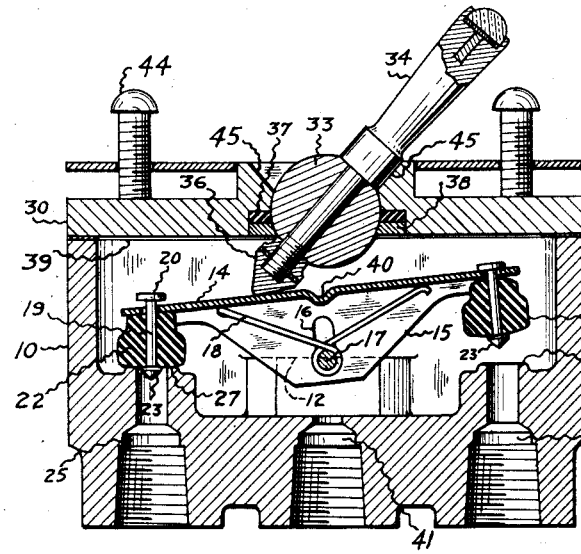
Figure 4:
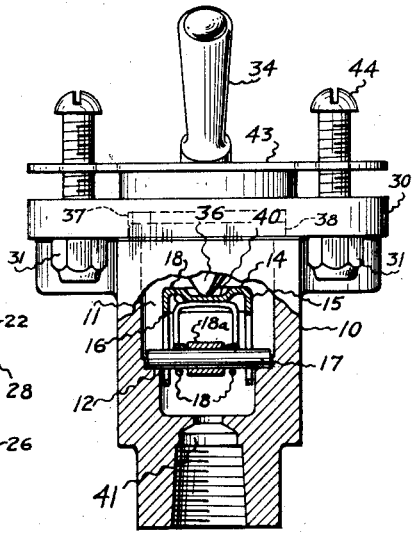
Figure 3:
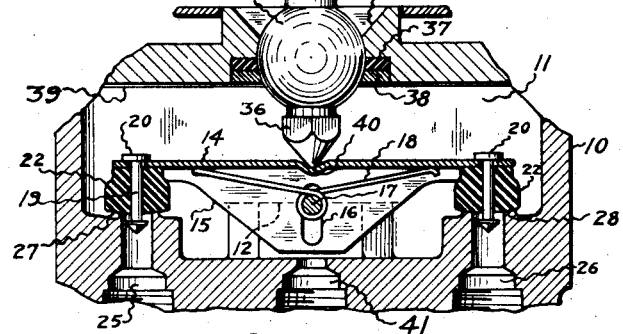

Fig. 1 is a plan view of a valve made according to the present invention; Fig. 2 is a vertical sectional view of the valve showing the rocker in one position, the section being taken on a plane indicated by line 2—2 of Fig. 1; Fig. 3 is a fragmentary sectional view showing the rocker in another position; Fig. 4 is an end view of the valve with a portion of the casing shown in section to illustrate the mounting of the rocker; Fig. 5 is a sectional view of a portion of a valve embodying a modified form of rocker.

Referring to Figs. 2 and 4, the valve shown therein for the purpose of illustration comprises an integrally formed casing 10 having a plurality of ports provided in the base thereof and communicating with a chamber 11 within the casing. The side walls of the casing 10 defining the chamber 11 are formed with inwardly projecting ledges 12 upon which the rocker 14 is pivotally supported. To provide the pivotal support, the rocker has centrally disposed downwardly extending lips 15 which are provided with aligned slots 16 for the reception of a pivot pin 17. The ends of the pin 17 extend beyond the sides of the rocker 14 and are supported in recesses formed in the ledges 12. A wire spring 18, encircling the pin 17 with one of its ends bearing against one end portion of the rocker and the opposite end bearing against the other end portion of the rocker, urges the rocker away from the pin and retains the pin in engagement with the recess. The spring is retained in proper position on the pin by a spacer sleeve 18a.

The ends of the rocker 14 have pins 19 loosely mounted therein with enlarged heads 20 formed on an end of the pins and engageable with the top surface of the rocker plate. The pins 19 have resilient sealing elements 22, formed preferably of neoprene disposed thereon intermediate the rocker plate 14, and a head 23 formed on the free end thereof. The base of the valve casing 10 is provided with ports 25 and 26 which have seats 27 and 28 adapted to be engaged by the resilient sealing elements 22. The ports 25 and 26 are provided with pipe threads, or other suitable arrangements for connecting the valve to conduits, not shown, leading to the instruments, sources of vacuum, or other instrumentalities to be controlled by the valve. A cover plate 30 secured upon the casing 10 by bolts 31 is provided with a socket in the central portion thereof for the reception of the ball 33 of an actuating handle 34. A resilient gasket 37 encircles the ball 33 within the socket formed in the cover plate and is compressively urged against the ball by a retaining washer 38 fitted within the socket, and held in place by the side walls of the casing 10, thus providing a seal at this point. The joint between the casing and the cover plate is sealed by a gasket 39. These seals are of great importance, for any leakage into or out of the casing might introduce an error in the reading of an instrument connected to the valve. An enlarged end portion 36 on the end of the handle within the casing is provided with a rounded point for engaging the top surface of the rocker 14. As shown in Fig. 3, the rocker is provided with a central recess 40 for the reception of the point formed on the handle for urging the rocker plate downwardly against the action of the spring 18 to compress both the resilient sealing elements 22 upon both the seats 27 and 28 when the handle is in its mid-position as shown in Fig. 3.

A port 41 formed in the base of the valve casing 10, intermediate the ports 25 and 26, is in direct communication with the valve chamber 11 at all times. This may also be provided with pipe threads or any other suitable fitting for connection to a third conduit, not shown. A face plate 43 is secured to the cover of the valve by bolts 44 for mounting the valve upon the instrument panel of an airplane.

The selector valve is particularly adapted for use with vacuum controlled or actuated instruments of the type employed in airplanes. In the use of the valve the spring 18 continuously urges the rocker plate 14 upwardly against the end portion 36 of the handle 34 and the parts are proportioned so that when the handle is moved to a vertical position the point slides into the recess 40 in the rocker plate with sealing elements 22 in engagement with both seats 27 and 28. The seating of the resilient elements 22 upon the seats 27 seals the valve chamber 11 against the passage of any fluid therethrough. Upon movement of the handle 34 to the position shown in Fig. 2, the rocker 14 will be pivoted about the pin 17 thereby opening the port 28 while retaining the port 27 closed. In this position, as well as the opposite position, the handle engages one of the sloping walls 45 in the boss 46, the walls acting as stops to limit the movement of the handle.

In the modified form shown in Fig. 5, the valve is formed in the same manner as that disclosed in Fig. 2 with the exception of the rocker plate 50, which is formed in such a manner that one of the side ports in the valve casing is always in communication with the chamber and the central line. Thus, the rocker plate 50 is not formed with a recess in the central portion thereof so that upon the actuation of the handle 52 the rocker plate is moved to close one of the ports while opening the remaining port, no central position being provided.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. In a valve embodying a casing having a chamber formed therein, a pair of ports in said casing communicating with the chamber, valve seats associated with said ports, a pivotally mounted rocker in said chamber having valve elements mounted on the ends thereof for engaging said seats, a spring in said chamber engaging said rocker and urging said rocker in a direction to unseat said valve elements, a handle pivotally mounted in said casing and having an end portion engageable with said rocker whereby said rocker and valve elements may be urged against the action of said spring towards one or the other of said seats upon actuation of said handle.

2. In a valve, a casing, a pair of ports in said casing, valve seats associated with said ports, a rocker supported in said casing having valve elements mounted adjacent the ends thereof for engaging said seats, actuating means pivotally mounted in said casing and slidably engaging said rocker and adapted to move said rocker to cause one or the other of said valve elements to engage its seat, and spring means urging said rocker into engagement with said actuating means.

3. In a valve, a casing, a pair of ports in said casing, valve seats associated with said ports, a pivot in said casing, a rocker mounted for rocking and sliding movement with respect to said pivot and having valve elements mounted adjacent the ends thereof for engaging said seats, actuating means supported by said casing and engageable with said rocker and adapted to move said rocker to cause one or the other of said valve elements to engage its seat, and spring means urging said rocker into engagement with said actuating means.

4. In a valve, a casing, a pair of ports in said casing, valve seats associated with said ports, a pivot in said casing, a rocker supported adjacent the central portion thereof for rocking and sliding movement with respect to said pivot and having elements mounted adjacent the ends thereof for engaging said seats, actuating means pivotally mounted in said casing and engageable with said rocker on one side of said pivot for urging one valve element into engagement with its seat, on the other side of said pivot for urging the other valve element into engagement with its seat, and adjacent said pivot for urging both valve elements into engagement with their seats, and spring means urging said rocker into engagement with said actuating means.

5. In a valve embodying a casing having a chamber formed therein, a plurality of inlet ports communicating with the chamber, a rocker plate disposed in said chamber and provided with downwardly extending side portions having vertical slots therein, a pivot pin extending through said slots for pivotally supporting the rocker plate within said chamber, pins loosely mounted in the ends of the rocker plate, resilient sealing elements on said pins mounted on the rocker plate, and adapted to engage said inlet ports, a spring disposed on said pivot pin with the ends thereof engaging opposite end portions of the rocker plate for retaining said sealing elements out of engagement with said ports, a handle pivotally mounted in said casing with the lower end portion thereof engaging said rocker plate whereby either of said inlet ports may be sealed upon the actuation of said handle.

6. In a valve embodying a casing having a chamber formed therein, a pair of inlet ports in the base of the casing communicating with the chamber, an outlet port intermediate the inlet ports, seats formed on the inner ends of the inlet ports, a pivotally mounted plate in said chamber having resilient sealing elements mounted on the ends thereof for engaging said seats, a spring in said chamber engageable with said plate for unseating said sealing elements, a handle pivotally mounted in said casing, a rounded point formed on the inner end thereof and engageable with said plate whereby said plate and sealing elements may be compressively urged towards one or the other of said seats upon the actuation of said handle.

BERT G. CARLSON.
CHARLES H. CRAWLEY.